Nov. 15, 1938.  B. R. BENJAMIN  2,136,607
DISK PLOW
Filed Dec. 24, 1936

Inventor
Bert R. Benjamin
By V. F. Lasagne
Att'y.

Patented Nov. 15, 1938

2,136,607

UNITED STATES PATENT OFFICE 2,136,607

DISK PLOW

Bert R. Benjamin, Oak Park, Ill., assignor to International Harvester Company, a corporation of New Jersey Application December 24, 1936, Serial No. 117,442

19 Claims. (Cl. 97—53)

The invention relates to a soil tilling implement. More particularly it relates to a tilling implement of the type especially adapted for use in semiarid areas for purposes of preparing the soil to utilize to the utmost advantage the benefits of whatever meager precipitation or moisture may occur in the form of rain or snow.

Specifically the invention relates to a rotatable tilling element for the implement.

While it is desirable to work the soil in such a manner as to obtain the above mentioned results, a machine or implement constructed especially for that purpose must be utilized; and, as a separate and different machine or implement must be employed for other types of soil tilling, a burden is placed on whoever may be confronted with the problem of providing the two types of implements.

The principal object of the invention, then, is to provide a rotatable tilling element that may be utilized on more than one type of machine or implement; in short, a tilling element that provides a means for the conversion from one type of soil tilling implement to another.

Further and more specifically, the object of the invention is to provide a disk for use in gangs, that has more than one shaft mounting possibility.

Another object is to provide a new and improved disk usable in a gang in a manner that will till the soil as in the ordinary disk harrow plowing procedure or in a special pit plowing method, and, of more importance, having a desirable interchangeability feature that provides for the use of the same disks and the same gangs for either.

Still another object of the invention is to provide a disk having a plurality of openings therein that will permit regulation of the depths of pits when the implement is used for pit plowing.

And still another object is to provide a disk in which the above mentioned objects may be easily and quickly accomplished.

These and other objects are accomplished and desired results obtained in the use of the new and improved rotatable tilling elements and the arrangement thereof on the tilling implement, preferred forms of which are embodied in the construction described in the following description and illustrated in the accompanying drawing, in which.

Figure 1:
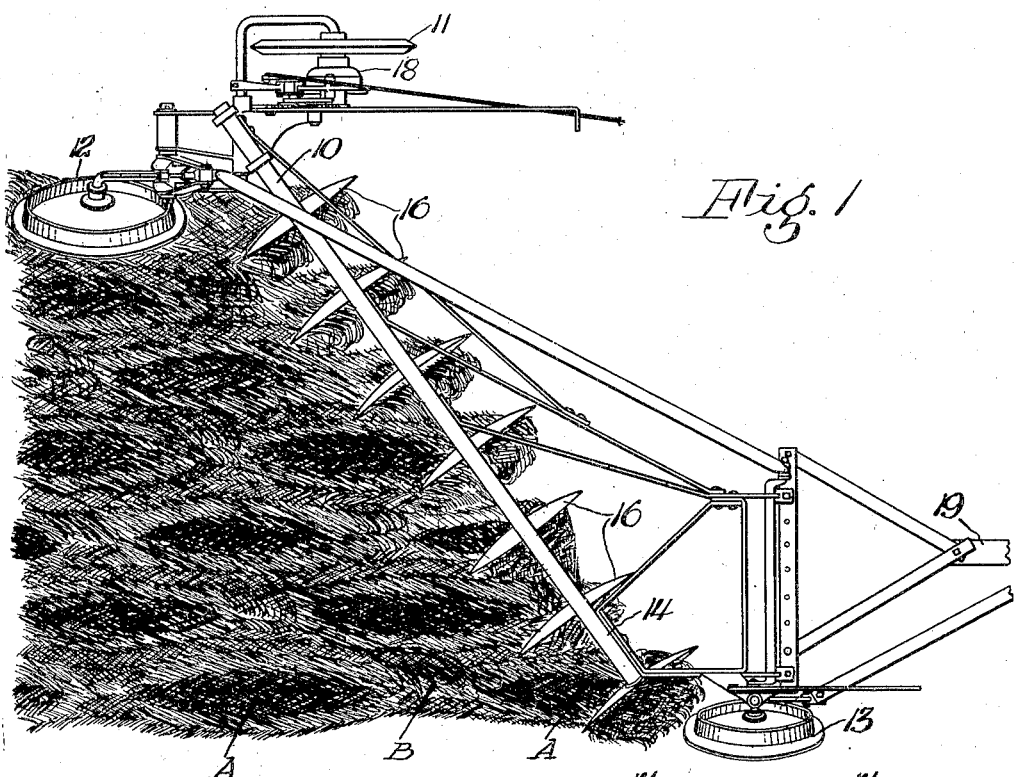
Figure 1 is a plan elevational view of a so-called harrow plow, utilizing to best advantage the new and improved disks for pit plowing and illustrating more or less diagrammatically the results obtained therefrom.

As previously stated, the new and improved disk may be utilized to best advantage on a regular disk gang plow, as indicated in Figure 1, which shows a plow of conventional construction comprising an ordinary plow gang 10 supported by the customary land wheel 11, rear furrow wheel 12 and front furrow wheel 13. A gang beam 14 carries by supporting brackets 15 a plurality of tilling elements in the form of spaced disks 16 mounted in spaced arrangement on a square shaft 17 for rotation therewith. The plow is provided with power lift mechanism 18 on the land wheel 11 and with draft means 19 at its forward end for connecting to a source of draft power.

Figure 4:
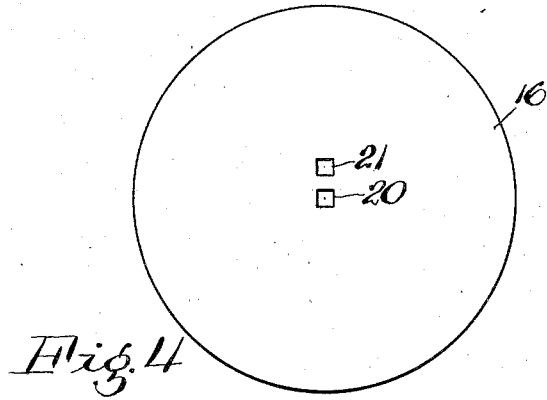

As best shown in Figure 4, a particular disk 16 is shown as provided with two square openings therein. One of these openings is concentrically located, as at 20; the other opening is eccentrically located, as at 21.

These openings 20 and 21 in the disks 16 provide for two different shaft mountings, the opening 20 being utilized for mounting the disks on the shaft 17 for use in regular harrow plowing, and the openings 21 for use in pit plowing. In other words one opening is centrally located with respect to the peripheral edge of the disk, and the other opening is disposed at different radial distances from various portions of said peripheral edge; and said edge may be spoken of as having proximal and distal peripheral edge portions, each at different radial distances from the opening 21.

Figures 2, 3:
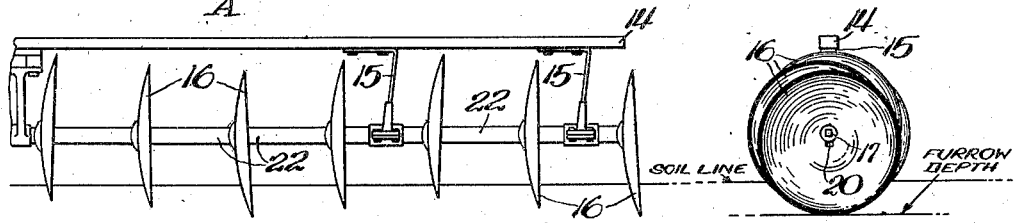
Figure 2 is a rear elevational view of the gang and disks, showing the spacing and positions of the disks.
Figure 3 is an end elevational view of Figure 2, illustrating more clearly the positions of the disks; and, Figure 4 is an enlarged side elevational view of one of the new and improved disks, showing the openings therein for interchangeable shaft mounting.

As best illustrated in Figures 2 and 3, the disks 16 are mounted on the shaft 17 for rotation therewith in axial spaced relation and in angularly spaced relation, the openings 21 being utilized as the shaft mountings. Spacers 22 are positioned on the shaft 17 for spacing the shafts, some of the spacers 22 providing for connection to the supporting brackets 15 on the gang beam 14.

In Figure 2, the disk at the extreme left of the gang is mounted eccentrically on the shaft 17 with its true center above the center of the shaft, and with the greater portion of the disk above the shaft and the lesser portion below the shaft and cutting the ground in a comparatively shallow furrow. The edge or portion now cutting the soil is closer to the axis of the shaft than is any other edge or portion of that disk. A vertical line will intersect the centers of both openings 20 and 21. Since this vertical line is a diameter of the disk, the upper and lower edges or portions are thus diametrically opposed and are located at the maximum and minimum distances, respectively, from the axis of the shaft. The particular disk above referred to is at the top of the gang 10 in Figure 1, and at the extreme rear in Figure 3.

Moving toward the right, the next disk 16 is rotated 90 degrees before being mounted on the shaft 17, so that a horizontal line will intersect the centers of both openings 20 and 21. In this position the disk 16 is positioned on the shaft 17 with its greater portion to the rear of the shaft and with equal portions thereof above and below the shaft and cutting a comparatively deeper furrow. The true center of the disk, or the center of the opening 20, is to the rear of the center of the shaft 17.

The next or third disk is rotated 90 degrees past the second or 180 degrees past the first disk, and is mounted on the shaft 17 with its greater portion below the shaft and cutting a still deeper furrow. A vertical line will intersect the centers of the openings 20 and 21, with the center of the opening 20 below the shaft as in the foremost disk in Figure 3.

The next or fourth disk is rotated 90 degrees past the third, or 270 degrees past the first, and is mounted on the shaft 17 to assume a position with the greater portion thereof ahead of the shaft and with equal portions thereof above and below the shaft. A horizontal line will intersect the centers of the openings 20 and 21, the center of the opening 20 being ahead of the center of the shaft. In this position the disk cuts a furrow as deep or as shallow as the second disk. The fifth disk on the shaft 17 assumes the same angular position as does the first disk; and, so on progressively along the shaft 17, so that a line rotated about the center of the shaft and through the centers of the openings 20 would be a helix or a spiral. Thus, it may be said that the disks 16 are spirally spaced apart on the shaft 17.

Now, looking to Figures 1 and 3 particularly, it will be seen that as the disks are spirally spaced on the shaft 17, the soil cutting depths of each are progressively increased and then decreased; and, as the soil line intersects a different portion of each disk, it is true that the chordal distances thereacross progressively increase and decrease. Because of the angle at which the disks are set, it follows that the width of the furrows progressively increases and decreases.

In operation, during the rotation of the disks, each disk gradually assumes the position of the disk adjacent, and of the disk adjacent, and so on. In short, the positions of the disks change until it may be said that the angular position of each at each 90 degrees of rotation is identical to the last preceding position of the disk adjacent thereto.

From the above, and upon examination of Figure 1, it will be seen that, as the gang 10 is moved forwardly, each disk 16, rotating with the shaft 17, cuts a furrow that is progressively deeper and shallower, and progressively wider and narrower; and, because of the angle of the gang, each deeper and wider portion of each furrow is offset with respect to an adjacent furrow, so that, theoretically, a straight line could be drawn through successively adjacent shallower and narrower portions, and a straight line parallel to that line could be drawn through successively adjacent deeper and wider portions. These deeper and wider cuts in the furrows are known as pits, which in Figure 1 will be generally designated by the letter A.

Of course, as each disk 16 rotates and cuts its furrow, it throws soil ahead and to one side (to the lower right in Figure 1). The soil thrown by each disk is deposited in the shallowest portions of an adjacent furrow to that side, further forming the pits A. This deposit of thrown soil will be generally designated as B in Figure 1, and it forms what may be termed a dam. It will be further apparent from the illustration in Figure 1 that pits are successively formed with successive deposits on dams intermediate.

Of course, the disks may be positioned on the shaft with greater or less spiral spacing than the 90° intervals employed in the present disclosure without departing from the theory of the invention and the results obtainable therefrom. Similarly, the amount of eccentricity of the opening 21 may be changed and it is a part of this invention to allow for numerous eccentric positions of the opening 21 in the disk 16 to accommodate the problems encountered in different types of soil. And, while the disk as disclosed in the description of the present invention may be utilized for both pit plowing and harrow plowing, it would not be departing from the spirit of the invention to provide a disk having only the eccentric opening 21 for use in pit plowing alone. The utilization of old and worn harrow plow disks with concentric openings and the provision of eccentric openings therein is also intended as part of the present invention, and it is apparent that a multiplicity of alterations in size, shape and position of various parts may be made without departing from the particular advantages derived from the use of the preferred embodiment of the invention as previously shown and described and hereinafter claimed.

What is claimed is:

1. A rotatable tilling element adapted to rotate with a shaft, said element consisting of a substantially circular disk formed with an eccentric opening therein for mounting the disk on the shaft.

2. A rotatable tilling element adapted to rotate with a shaft, said element consisting of a disk formed with a soil-engaging edge and with a concentric opening and an eccentric opening therein for mounting the disk on the shaft to obtain a constant depth soil-engaging edge and a variable depth soil-engaging edge.

3. A rotatable tilling element adapted to rotate with a shaft, said element consisting of a disk formed with a soil-engaging edge and with a plurality of openings therein for mounting the disk on the shaft to obtain a plurality of variable depth soil-engaging edges.

4. A tilling element comprising a substantially circular disk formed with a plurality of openings therein, at least one of said openings being concentric.

5. A tilling element adapted to be mounted on a shaft, said element having a cutting edge formed about a center, said element having a plurality of means for mounting on a shaft, at least one of said means being concentric with said center, and another of said means being spaced therefrom.

6. A tilling element adapted to be mounted on a shaft, said element including a plurality of peripheral cutting edges, each formed about and being substantially the same distance from a common point on the element, said element having means for mounting it on a shaft, said means being located at a point spaced from the aforesaid point.

7. A tilling element having diametrically opposed, substantially circular cutting edges formed about a common center, said element being formed with an opening spaced from said center.

8. In a tilling implement, a gang comprising a shaft and a plurality of substantially circular disks mounted on the shaft for rotation therewith as a unit, each of said disks being mounted on the shaft at a point spaced from the true center of the disk, said disks being arranged on the shaft in spirally spaced relation.

9. In a tilling implement, a gang comprising a shaft and a plurality of tilling elements mounted thereon for rotation therewith as a unit, each of said elements having substantially diametrically opposed, substantially circular cutting edges formed about a common center, each of said elements being mounted on the shaft at a point spaced from said center, said elements being arranged on the shaft in spirally spaced relation.

10. In a tilling implement, a gang comprising a shaft and a plurality of tilling elements mounted thereon for rotation therewith as a unit, each of said elements having a plurality of substantially circular cutting edges formed about a common center, each of said elements being mounted on the shaft at a point spaced from said center, said elements being arranged on the shaft in spirally spaced relation.

11. In a tilling implement, a gang comprising a shaft and a plurality of tilling elements mounted thereon for rotation therewith, each of said elements having substantially diametrically opposed, substantially circular cutting edges formed about a common center, each of said elements being mounted on the shaft at a point spaced from said center.

12. In a tilling implement, a gang comprising a shaft and a plurality of tilling elements mounted thereon for rotation therewith, each of said elements having a plurality of substantially circular cutting edges formed about a common center, each of said elements being mounted on the shaft at a point spaced from said center.

13. In a tilling implement, a gang comprising a shaft and a plurality of tilling elements mounted thereon for rotation therewith, each of said elements having a plurality of peripheral cutting edges, each disposed about a common center and each substantially the same distance from said center at corresponding points in their peripheral lengths, each of said elements being mounted on the shaft at a point spaced from said center.

14. In a tilling implement, a gang comprising a shaft and a plurality of substantially circular disks mounted thereon for rotation therewith, each of said disks being mounted on the shaft at a point spaced from the true center of the disk.

15. In a tilling implement, a gang comprising a shaft and a plurality of tilling elements mounted on the shaft for rotation therewith as a unit, each of said elements having a plurality of peripheral cutting edges, each disposed about a common center and each substantially the same distance from said center at corresponding points in their peripheral lengths, each of said elements being mounted on the shaft at a point spaced from said center, said elements being spaced apart on the shaft in staggered relation.

16. In a tilling implement, a gang comprising a shaft and a plurality of substantially circular disks mounted on the shaft for rotation therewith as a unit, each of said disks being mounted on the shaft at a point spaced from the true center of the disk, said disks being spaced apart on the shaft in staggered relation.

17. In a tilling implement, a gang comprising a shaft and a plurality of tilling elements mounted thereon for rotation therewith as a unit, each of said elements having substantially diametrically opposed, substantially circular cutting edges formed about a common center, each of said elements being mounted on the shaft at a point spaced from said center, said elements being spaced apart on the shaft in staggered relation.

18. In a tilling implement, a gang comprising a shaft and a plurality of tilling elements mounted thereon for rotation therewith as a unit, each of said elements having a plurality of substantially circular cutting edges formed about a common center, each of said elements being mounted on the shaft at a point spaced from said center, said elements being spaced apart on the shaft in staggered relation.

19. In a tilling implement, a gang comprising a shaft and a plurality of tilling elements mounted on the shaft for rotation therewith as a unit, each of said elements having a plurality of peripheral cutting edges, each disposed about a common center and each substantially the same distance from said center at corresponding points in their peripheral lengths, each of said elements being mounted on the shaft at a point spaced from said center, said elements being arranged on the shaft in spirally spaced relation.

BERT R. BENJAMIN.